Patented Feb. 26, 1924.

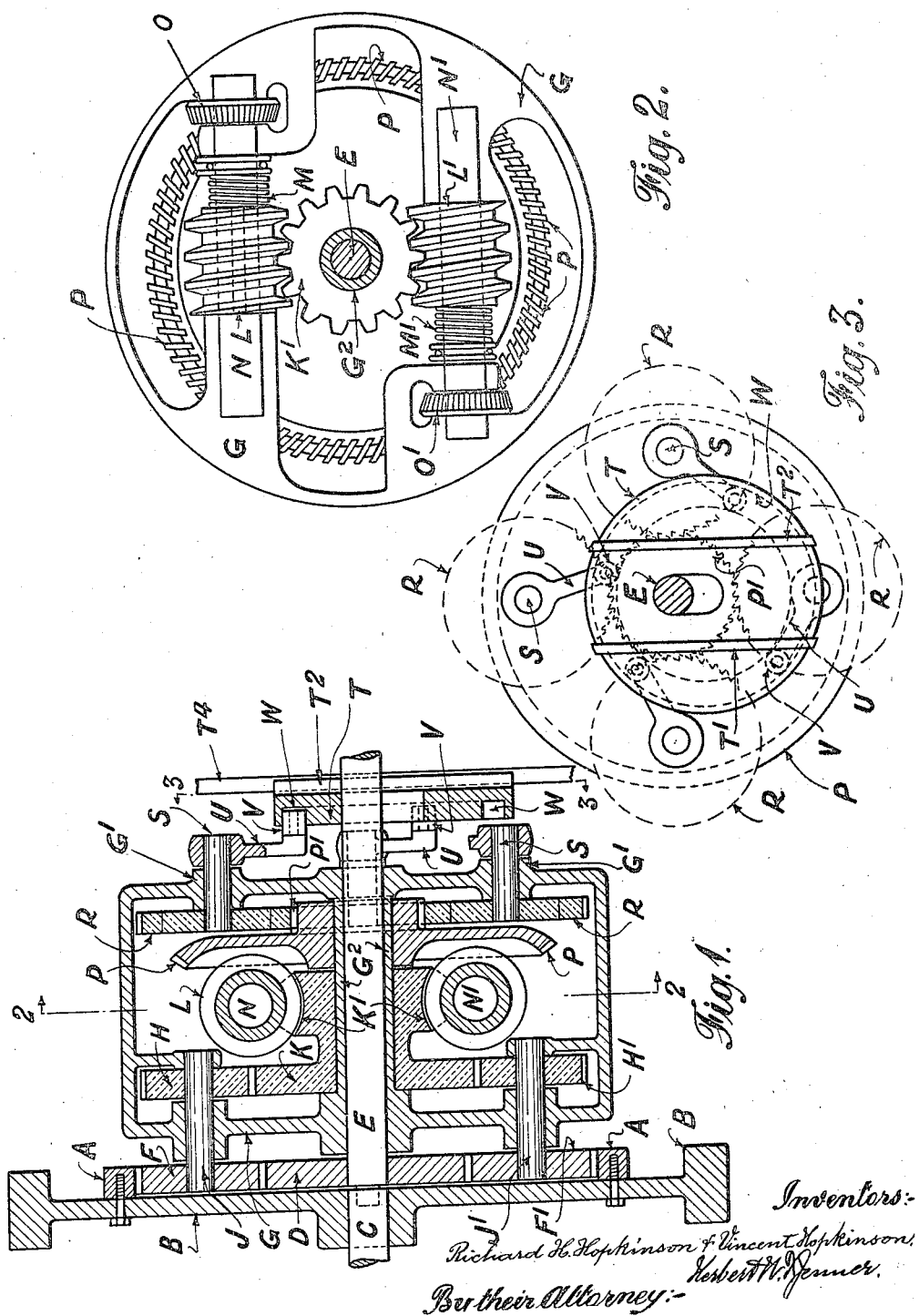

1,484,711

UNITED STATES PATENT OFFICE.

RICHARD HENRY HOPKINSON AND VINCENT HOPKINSON, OF BRADFORD, ENGLAND.

VARIABLE-SPEED GEARING FOR MOTOR VEHICLES AND MACHINERY.

Application filed October 29, 1923. Serial No. 671,378.

*To all whom it may concern:*

Be it known that we, RICHARD HENRY HOPKINSON and VINCENT HOPKINSON, subjects of the King of Great Britain and Ireland, and residents of Bradford, in the county of York, England, have invented Improvements in Variable-Speed Gearing for Motor Vehicles and Machinery, of which the following is a specification.

These improvements relate to variable speed gearing for the driving of one shaft—hereinafter referred to as the driven shaft—from another shaft—hereinafter referred to as the driving shaft—in such a manner that the speed of the driven shaft may be varied in ratio to the speed of the driving shaft, the variation of speed being effected to any degree, from zero to a speed which is equal to that of the driving shaft, whilst at the same time ensuring that all the wheel and pinion members of the mechanism shall always be in mesh and the variation of speed be effected in a positive manner. The improvements are particularly applicable to automobiles, wherein the driving shaft will be the engine shaft and the driven shaft the propeller shaft. In the case of automobiles, the direct drive will be the top or highest speed; and all gradations downwards to free engine may be obtained, thus dispensing with a clutch between the shafts. Further, the mechanism will allow of reversal of the automobile, whilst all the gear members still remain in mesh.

With these objects in view, we provide an epicyclic gear the planetary pinions of which are rotated by the driving shaft, and the sun wheel of which is fixed on the driven shaft, the latter being in the same plane as the driving shaft, and worm drums meshing with toothed gearing interposed between said drums and the planetary pinions, with means for giving a variable speed of rotation to the worm drums. Thus, if no rotation is imparted to the worm drums the worms will lock the gearing and the epicyclic motion will rotate around its centre, with the driven shaft, at the same speed as the driving shaft. The worms being rotated, rotary motion is imparted to the planetary pinions in any desired varying degree, independently of the rotary motion imparted to them from the driving shaft, to allow them to have epicycloidal motion around their sun wheel, the degree of motion thus imparted to them governing the speed of the driven shaft on which the sun wheel is fixed, or, when such rotary motion is sufficiently high, causing the impulse imparted to the planetary pinions by the driving shaft to be neutralized by such motion, with the result that the driven shaft will be stationary. When the independent rotary motion of the planetary pinions exceeds the rotary motion given to the said pinions by the driving shaft, the driven shaft is, through the sun wheel, given a reverse motion, as will be understood.

The improvements will now be fully described with reference to the accompanying drawings, which illustrate them in the most convenient form known to use for the purpose in view and wherein :—

Figure 1 is a vertical longitudinal section showing the driving and driven shafts and the various members of the gearing;

Figure 2 is an elevation to an enlarged scale of the worms which are driven at variable speed to control the planetary pinions of the epicyclic gear train;

Figure 3 is an elevation of part of the mechanism for driving the worm shafts and for varying the speed imparted to such shafts.

Figure 4:
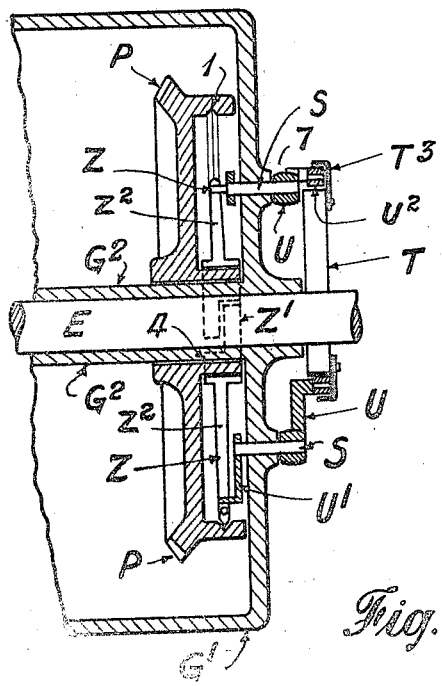
Figures 4 and 5 are fragmentary views of a modification of the means for varying the rotary speed of the worm drums.

Referring to Figure 1, A is a crown wheel secured to the disc B, which may be the engine fly wheel fixed on the driving shaft C. D is the sun wheel of an epicyclic gear train, said wheel being keyed to the driven shaft E and meshing with the planetary pinions F. G is a spider or arrangement of radial arms which form bearings for the spindles J and J¹ to which are fixed the planet wheels F and F¹, and which arms are continued horizontally and join opposite arms G¹, the whole thus forming a cage and also bearing arms for the various members of the gearing. On the spindles J and J¹ are also fixed the planetary pinions H and H¹ gearing with the centre or sun wheel K, which is loose on a sleeve G² on driven shaft E. By this arrangement any rotary motion imparted to pinions F and F¹ is imparted to H and H¹ and vice versa. Compounded with the sun wheel K is the pinion K¹ which meshes with two worms, L and L¹, fitted respectively on shafts N and N¹ as shown clearly in Figure 2. The shaft N has fixed thereon the bevel pinion O and the shaft N¹ similarly bears a bevel pinion O¹.

On the shaft N the worm drum L is slidable and abuts against a helical spring which bears against a collar with a thrust ball bearing as shown in Figure 2, and on the shaft $N^1$ a similar spring $M^1$ is similarly arranged in relation to $L^1$. The bevel pinions O and $O^1$ mesh with the teeth of a race of a double-race pinion P—Figures 1 and 2—the other race $P^1$ of which toothed wheel P meshes with ratchet wheels R, which may be of any convenient number. Four are shown in the drawings, but we may employ five. Each ratchet pinion is fixed upon a spindle S the said spindles being rotatably borne by radial arms $G^1$. For the sake of clearness, the ratchet gear of these ratchet pinions R is omitted, but it will be understood that they consist of an outer annular part having a toothed periphery, and internally they are arranged exactly as in a free wheel as employed on cycles, that is to say, the outer portion may have rotary motion one way only when the spindle S is rotated, but may run freely around the wheel P when overrunning their ratchet pawl or equivalent member. At the outer end of each spindle S is fixed a lever U, which is cranked at its outer free end and terminates in an anti-friction roller V. Loosely mounted on the shaft E is the cam T, which is slidable vertically by means of the bars $T^1$ attached thereto, and which bars slide in grooved bars $T^2$ which are fixed to any convenient supports above and below the gearing. Any known means may be employed for adjusting the cam T in a vertical direction; for instance a lever may be pivotally secured thereto, the said lever being jointed to a further lever operated from the driver's seat of the automobile. An annular groove W is formed in the cam member T within which groove the rollers V are in constant engagement.

Cam T being placed eccentric to the toothed wheel P, and shaft C rotated, crown wheel A rotates the planetary pinions F and $F^1$ and consequently the pinions H and $H^1$. Rotation of the pinions F involves the rotation of the cage $G$ $G^1$ bearing the spindles J and $J^1$ and the spindles S of the ratchet pinions R. The levers U attached to spindles S thus trail around the cam T, their ends engaging in the groove as already stated, and a rotary motion is imparted to each of the ratchet wheels in series. On the let off side of the cam T the ratchet pinions R rotate idly as their levers enter that part of the groove W. It will be seen therefore that motion is imparted to the wheel P through its engagement with the ratchet wheels, this rotary motion varying with the position of cam T.

The cage $G$ $G^1$ rotating as stated, and the wheel P being rotated by the ratchet pinions R, rotary motion is given to the worm drums L and $L^1$ through the wheel P, and the pinions O and $O^1$ on the worm drum shafts N and $N^1$. Thus through pinion $K^1$, sun wheel K, planetary pinions H and $H^1$, a certain amount of slip is allowed to the planetary pinions F and $F^1$, and when the planetary pinions F and $F^1$ are thus rotated at a speed which is equal to the speed which would be imparted to them by their engagement with the crown wheel A, no motion of sun wheel D and shaft E takes place on rotation of shaft C. This is the free engine position. On the cam T being adjusted to slow the speed imparted to wheel P and thus to the planetary pinions F and $F^1$ through the worm drums, motion is given to the sun wheel D, this motion varying with the speed of the worm drums L and $L^1$, as will be understood. When the cam T is concentric with the wheel P, the levers U will not be actuated and wheel P will not be rotated by the ratchet wheels R. Thus the worm drums L and $L^1$ do not rotate, and all the planetary pinions, and the sun wheels are locked together. The whole gear therefore rotates as a solid unit, rotary speed of shaft E being equal to the rotary speed of shaft C. This is the top speed.

Any gradation of speed between free engine and top speed can therefore be obtained by altering the position of the cam T and thus varying the speed of the wheel P.

The springs M and $M^1$ not only give a certain flexibility and absence of shock on movement of the various parts of the gearing, but they give to the first planetary pinions F and $F^1$ an initial push or precedence, to cause the said pinions to rotate around their own axes.

It will now be understood that if the worm drums L and $L^1$ are rotated by wheel P at such a speed that the planetary pinions F and $F^1$ are rotated at a higher speed than is imparted to them by the crown wheel A, the result is that by their rotation around their axes they impart to the sun wheel D and consequently to the driven shaft E a rotary motion which is the reverse of any motion given to the sun wheel D and shaft E when the cam is adjusted for the forward drive. The reverse motion of the shaft E is thus obtained, and as will be obvious, the adjustment of the cam to a "reverse" position will act as an effective brake on the forward drive.

Figure 5:
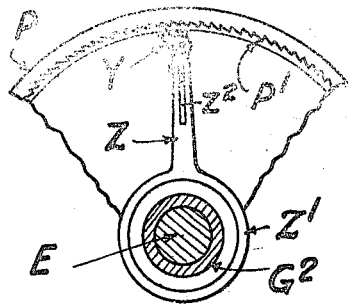

In Figures 4 and 5 is illustrated a modification, now to be described, of the means for driving the worm shafts N and $N^1$ at a variable speed. E is the driven shaft as before, $G^2$ the sleeve upon the shaft, and P the wheel which is in mesh with the bevel pinions O and $O^1$ on the worm drum shafts N and $N^1$ of Figure 1. T is the stationary cam, and U the levers secured upon spindles S. Instead of the teeth P¹ of Figure 1 the wheel P is provided with a ratchet P¹ with which engage pawls Y pivoted upon arms Z rotatably mounted on the sleeve G² by bosses Z¹. The levers U carry cranked arms U¹ which fit within slots Z² in the arms Z. Around the cam T is fitted an angle ring T², thus forming a groove in which may run the ends of levers U, which are provided with anti-friction rollers U². Thus, as the cage G rotates, and with it the spindles S, that lever U which is at any moment on the effective portion of the cam will operate its arm Z to give a rotative impulse to the wheel P through the pawl Y, the ratchet P¹ overrunning any pawl Y which is not at the given moment in a position to give an effective impulse to the said wheel. Movement of the cam T in a vertical direction will vary the period of time during which any lever U is in contact with its effective surface, thus giving the desired variation of speed to wheel P. When the cam T is concentric with the shaft E, the movement of wheel P is of course nil, and the worm drums L and and L¹ are not rotated.

We do not confine ourselves to the precise construction and relative arrangement of the various members as shown in the drawings, as variations may be effected in the mechanical details. As will be understood, the relative dimensions of the members may be varied to give the desired relative speeds of the wheels and pinions and worm drums, such variation, together with variations of mechanical details, being within the capacity of persons skilled in the art.

We claim:—

1. A variable speed gearing for a driving shaft and a driven shaft, comprising an epicyclic gear train the planetary pinions of which are operatively connected with one of the said shafts, and the sun wheel of which is secured on the other shaft, toothed pinions arranged concentric with and revolving with the planetary pinions, a toothed wheel journaled concentric with the said sun wheel and meshing with the said toothed pinions, a toothed worm pinion arranged concentric with and revolving with the said toothed wheel, worm drums meshing with the said worm pinion, driving devices for rotating the worm drums, a rotary support arranged concentric with the said sun wheel, levers having spindles mounted in the said support and arranged around its axis, means for actuating the said driving devices from the said spindles, and a non-revoluble cam engaging with the said levers and operating to rock their spindles when the cam is arranged eccentric of the rotary support.

2. As a means for varying the speed and direction of rotation of a driven shaft in relation to the speed and direction of rotation of its driving shaft, an epicyclic gear train the planetary pinions of which are rotated by the driving shaft, the sun wheel of which is fixed on the driven shaft, worm drums, a worm pinion meshing with the worm drums and journaled concentric with the said sun wheel, gearing operatively connecting the planetary pinions with the said worm pinion, shafts for the worm drums, bearings for the said shafts, gearing to drive the said shafts, a plurality of ratchet pinions always in mesh with a toothed wheel of the said gearing and rotatable around their own axes and around the axis of said wheel, levers connected to said ratchet pinions, and an adjustable cam member with which the free ends of the levers are in sliding contact.

3. As a means for varying the speed and direction of rotation of a driven shaft in relation to the speed and direction of rotation of its driving shaft, two epicyclic gear trains in parallel planes each member of one train being concentric with the equivalent member of the other train, the sun wheel of the first train being fixed on the driven shaft and the sun wheel of the second train being loose on the driven shaft, means for rotating the planetary pinions of the two trains from the driven shaft, worms in mesh with the sun wheel of the second train compression springs, shafts on which the worm drums are mounted to slide against the said compression springs, bearings for the said shafts and for the planetary pinions of the epicyclic gear trains, which bearings rotate in the epicycloidal path of the planetary pinions, spur gearing for the worm drum shafts, a toothed wheel forming part of such gearing and loose on the driven shaft, a plurality of ratchet pinions always in mesh with the toothed wheel and placed around the periphery thereof, bearings for the ratchet pinions which bearings rotate in the epicyloidal path of the planetary pinions of the gear trains, levers connected to said ratchet pinions, and an adjustable cam with which the free ends of the levers are in sliding contact.

In testimony whereof we have hereunto set our hands.

RICHARD HENRY HOPKINSON.
VINCENT HOPKINSON.